United States Patent [19]

Doi

[11] Patent Number: 5,548,031

[45] Date of Patent: Aug. 20, 1996

[54] COPOLYMER PRODUCTION PROCESS

[75] Inventor: Toru Doi, Yamaguchi-ken, Japan

[73] Assignee: Tosoh Corporation, Japan

[21] Appl. No.: 340,334

[22] Filed: Nov. 14, 1994

[30] Foreign Application Priority Data

Nov. 19, 1993 [JP] Japan .................................. 5-290544

[51] Int. Cl.$^6$ .................................................. C08F 20/08
[52] U.S. Cl. .................................. 525/327.4; 525/329.4;
526/303.1; 526/306; 526/307.8; 526/318.25;
526/318.3; 528/335; 528/336; 528/345
[58] Field of Search .......................... 525/327.4, 329.4;
528/335, 336, 345; 526/303.1, 306, 307.8,
318.25, 318.3

[56] References Cited

U.S. PATENT DOCUMENTS

| | | |
|---|---|---|
| 3,458,295 | 7/1969 | Mehmedbasich . |
| 4,169,924 | 10/1979 | Barabas et al. . |
| 4,481,319 | 11/1984 | Sackmann et al. . |
| 4,588,786 | 5/1986 | Kadono et al. . |
| 4,933,395 | 6/1990 | Canova et al. .......................... 525/327.6 |
| 5,064,922 | 11/1991 | Wamprecht et al. ................. 525/327.6 |
| 5,223,582 | 6/1993 | Blum et al. ........................... 525/327.6 |
| 5,356,550 | 10/1994 | Cook et al. ........................... 525/327.6 |

FOREIGN PATENT DOCUMENTS 0009185  4/1980  European Pat. Off. .
2393818  1/1979  France .

OTHER PUBLICATIONS

Patent Abstracts of Japan vol. 9, No. 45 (C–268) (1768) Feb. 26, 1985.

*Primary Examiner*—James J. Seidleck
*Assistant Examiner*—John M. Cooney, Jr.
*Attorney, Agent, or Firm*—Nixon & Vanderhye

[57] ABSTRACT

A process for producing a copolymer having succinimide units represented by general formula (I) is provided which comprises reaction of a copolymer constituted of 40–60 mole % of maleic anhydride units, 60–40 mole % of olefin units, and 0–20 mole % of another copolymerizable monomer units with an amine to convert the maleic anhydride units to the succinimide units, wherein the succinimide units are formed by ring-closing imidation in a slurry state in a poor solvent:

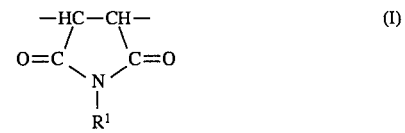

where $R_1$ is a hydrogen atom, or an alkyl or cycloalkyl group of 1 to 6 carbons. The copolymer has low yellowness and high transparency.

3 Claims, No Drawings

COPOLYMER PRODUCTION PROCESS

BACKGROUND OF THE INVENTION

1. Field of the Invention

The present invention relates to a process for producing a copolymer which has low yellowness and high transparency and which is useful for transparent parts such as optical parts, automobile parts, and electric and electronic parts.

2. Description of the Related Art

In recent years, application of transparent plastics is actively investigated for optical parts such as optical lenses, and optical fibers; automobile parts such as headlight lenses and sunroofs, and the like for productivity and light weight of the parts. With progress of the investigation, the requirement for the properties of the transparent plastics are becoming severer increasingly. In particular, improvement of the heat resistance thereof is strongly demanded.

Copolymers having succinimide units have been investigated comprehensively because of their high heat resistance. For example, copolymerization of methyl methacrylate with N-aromatic-substituted maleimide is disclosed in JP-B-43-9753, JP-A-61-141715, JP-A-61-171708, and JP-A-62-109811; incorporation of N-aromatic-substituted maleimide into a styrene type resin by copolymerization is disclosed in JP-B-47-6891, JP-A-61-76512, and JP-A-61-276807. At the higher content of the N-aromatic-substituted maleimide, the resins obtained by these methods have higher heat resistance, but involve disadvantages of brittleness, poor processability, discoloration, and so forth.

On the contrary, copolymers constituted of succinimide unites and olefin units are superior in heat resistance and mechanical properties.

British Patent 815821 discloses a process for producing a succinimide copolymer by reaction of a maleic anhydride-olefin copolymer with a methylamine. In this process, a maleic anhydride copolymer is amidated with methylamine in benzene, then the solvent is removed, and the residue is heated in an oven to convert the formed amide to an imide to obtain a pale yellow resin. The color tone of the polymer is shown to be improved by eliminating the remaining maleic anhydride and conducting the reaction in an inert atmosphere.

Journal of Polymer Science, Part C., No.16, p.387 (1967) describes an imide-forming reaction (imidation) of maleic anhydride copolymer with an alkylamine in acetic acid or benzene.

The copolymers obtained by the above methods, however, are not sufficient yet to meet the demand for the transparent plastics although the yellowness is somewhat mitigated.

After comprehensive studies to solve the above problems, it was found by the inventors of the present invention that the above problems are solved by a succinimide unit-containing maleic anhydride-olefin copolymer produced by reaction of a maleic anhydride-olefin copolymer with an amine and subsequent ring-closing imidation in a slurry state in a poor solvent, and the present invention has been completed.

SUMMARY OF THE INVENTION

The present invention intends to provide a process for producing a copolymer which has low yellowness and is superior in transparency, heat-resistance, and mechanical strengths.

The process for producing a copolymer having succinimide units represented by general formula (I) and having low yellowness and high transparency of the present invention comprises reaction of a copolymer constituted of 40–60 mole % of maleic anhydride units, 60–40 mole % of olefin units, and 0–20 % of another copolymerizable monomer units, with an amine to convert the maleic anhydride units to the succinimide units, wherein the succinimide units are formed by ring-closing imidation in a slurry state in a poor solvent:

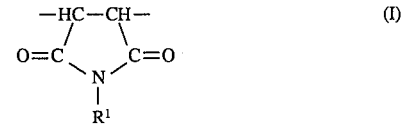

(I)

where $R_1$ is a hydrogen atom, or an alkyl or cycloalkyl group of 1 to 6 carbons.

DETAILED DESCRIPTION OF THE PREFERRED EMBODIMENTS

The maleic anhydride/olefin copolymer employed in the present invention can readily be prepared by radical copolymerization of maleic anhydride, an olefin, and another copolymerizable monomer.

The olefin useful in the present invention includes ethylene, isobutene, 2-methyl-1-butene, 2-methyl-1pentene, 2-methyl-1-hexene, 2-methyl-1-heptene, 1-isooctene, 2-methyl-1-octene, 2-ethyl-1-pentene, 2-methyl-2-butene, 2-methyl-2-pentene, 2-methyl-2-hexene, and the like olefins. Of these olefins, isobutene is preferred from the standpoints of heat resistance and the mechanical properties. The olefin may be a mixture of two or more thereof.

Another copolymerizable monomer may be incorporated into the above copolymer in such an amount that the above objects of the present invention is not impaired. The copolymerizable monomer includes styrene and styrene derivatives such as 1,3-methylstyrene, and methylstyrene; dienes such as 1,3-butadiene, and isoprene; methacrylate esters such as methyl methacrylate, and ethyl methacrylate; acrylate esters such as methyl acrylate, and ethyl acrylate; vinyl ethers such as methyl vinyl ether, and ethyl vinyl ether; and so forth. These monomers may be used singly or in combination of two or more thereof.

The process for polymerization for the maleic anhydride/olefin type copolymer employed in the present invention is not specially limited. However, the polymerization is preferably conducted by a radical precipitation polymerization process in which copolymerization is conducted in a solvent which dissolves maleic anhydride but does not dissolve the formed polymer to precipitate the resulting copolymer in a particle state. Thereby the remaining maleic anhydride which affects the discoloration can be decreased and the resulting copolymer can be obtained in a particle shape. The solvent for the precipitation polymerization is exemplified by acetate esters such as ethyl acetate, propyl acetate, and butyl acetate, and mixed solvents such as a mixture of an acetic ester with an alcohol. In the polymerization, a dispersion stabilizer of cellulose type, polyvinyl alcohol type, or the like may be used.

The polymerization initiator for the copolymerization of maleic anhydride with the olefin includes organic peroxides such as benzoyl peroxide, lauroyl peroxide, octanoyl peroxide, acetyl peroxide, di(t-butyl) peroxide, t-butylcumyl peroxide, dicumyl peroxide, t-butyl peroxyacetate, t-butyl peroxybenzoate, and t-butyl peroxyneodecanoate; azo type initiators such as 2,2'-azobis(2,4-dimethylvaleronitrile), 2,2'-azobis(2butylonitrile), 2,2'-azobisisobutyronitrile, dimethyl-2,2'azobisisobutyrate, and 1,1'-azobis(cyclohexane-1carbonitrile).

The polymerization temperature depends on the decomposition temperature of the initiator. Generally the polymerization is preferably conducted at a temperature ranging from 40 to 120° C.

The maleic anhydride/olefin copolymer used in the present invention is constituted of 40–60 mole % of maleic anhydride units, 60–40 mole % of olefin units, and 0–20 mole %, more preferably from 0–5 mole %, still more preferably 0–1 mole % of another copolymerizable monomer units.

The copolymerization is preferably carried out with excess of the olefin, with the mole ratio of maleic anhydride to the olefin being not more than 1, since the remaining maleic anhydride monomer in the maleic anhydride/olefin copolymer causes discoloration of the imidated copolymer. The remaining maleic anhydride in the formed copolymer can be removed after the copolymerization by washing the polymer particles with a solvent which dissolves maleic anhydride but does not dissolve the copolymer. The amount of the remaining maleic anhydride monomer in the maleic anhydride/olefin copolymer to be used in the present invention is in the range of preferably not more than 1%, more preferably not more than 0.1% by weight.

The maleic anhydride/olefin copolymer employed in the present invention has a relative solution viscosity in the range of from 1 to 10.0, more preferably from 1.5 to 5.0, which is the ratio $(t_1/t_0)$ of the flow time $(t_1)$ of a 0.5 g/dl solution of maleic anhydride/olefin copolymer in N,N-dimethylformamide to the flow time $(t_0)$ of N,N-dimethylformamide at 23° C. With such a relative solution viscosity, the resulting imide copolymer has improved moldability and improved mechanical strengths.

The amine compound employed in the process of the present invention includes primary amines of 1 to 6 carbons such as methylamine, ethylamine, n-propylamine, isopropylamine, n-butylamine, s-butylamine, t-butylamine, and cyclohexylamine; ammonia; and compounds which produce readily ammonia or primary amine on heating such as dimethylurea and diethylurea. The amine compound may be used singly or in combination of two or more thereof. Of these amines, methylamine, ethylamine, isopropylaimine, and cyclohexylamine are preferred since they are capable of improving greatly the heat resistance of the resulting copolymer.

The copolymer containing succinimide units of the present invention is synthesized from a maleic anhydride/olefin copolymer and an amine through two steps of reactions: the amidation reaction of the maleic anhydride/olefin copolymer, and the subsequent ring-closing imidation reaction. These reactions may be conducted in the same reactor either successively or continuously, or may be conducted respectively in separate reactors. The types of the reactors for the reactions are not limited, and may be a vessel type reactor, a tubular type reactor, a screw extruder type reactor, or the like.

The process of the present invention is characterized in that at least the ring-closing imidation reaction of the amidated product of the maleic anhydride/olefin copolymer is conducted in a slurry state in a poor solvent.

The amidated product of the maleic anhydride/olefin copolymer employed in the production process of the present invention is preferably obtained in a particle shape. In particular, the maleic anhydride/olefin copolymer particles prepared by the aforementioned precipitation polymerization is preferred for the reaction with the amine in a slurry state.

The solvent employed for the amidation is those which dissolves neither the maleic anhydride/olefin copolymer nor the amidated product thereof. The solvent includes aromatic solvent such as benzene, toluene, and xylene; acetate esters such as propyl acetate, and butyl acetate; aliphatic hydrocarbon solvents such as hexane, octane, decane, and dodecane; and mixtures thereof. In particular, the same solvent as in the copolymerization is preferably used in view of the productivity. The temperature of amidation reaction is usually in the range of from 0 to 150° C., but is not limited thereto.

The ring-closing imidation reaction in the present invention is conducted by heating the particulate amidated product of the aforementioned maleic anhydride/olefin copolymer dispersed in a poor solvent in a slurry state for ring closure.

The temperature of the imidation is generally in the range of from 120 to 300° C., preferably from 150 to 250° C., more preferably from 165 to 220° C. At the reaction temperature of lower than 120° C., the imidation reaction does not proceed at an appropriate reaction velocity, while at the reaction temperature of higher than 300° C., the slurry state cannot be maintained during the reaction owing to blocking, and discoloration is liable to be caused by heat deterioration. The reaction temperature may be raised or lowered, stepwise or continuously. A basic or acidic substance such as triethylamine and toluenesulfonic acid may be added as the reaction catalyst into the reaction system.

The imidation ratio depends on the reaction temperature, the reaction time, and other factors. For the sufficient heat resistance, preferably not lower than 80 mole %, more preferably not lower than 95 mole %, still more preferably not lower than 99 mole % of the maleic anhydride units in the copolymer are converted to succinimide units. If the imidation ratio is lower than 80 mole %, the heat resistance of the copolymer tends to be lower.

The poor solvent used in the aforementioned ring-closing imidation includes those which do not cause blocking, by dissolution or swelling, of the amidation product of the maleic anhydride/olefin and the imidation product formed by the ring-closing imidation at the imidation temperature. The poor solvent herein includes those which has a solubility parameter, $\delta$ value $(cal/cm^3)^{1/2}$, described in "Polymer Handbook" (3rd Edition edited by J. Brandrup and E. H. Immergut, published by John Wiley & Sons), of preferably not higher than 9.0, more preferably not higher than 8.5, still more preferably not higher than 8.0. With the solvent having a parameter of higher than 9.0, the slurry state during the reaction is liable to be destroyed by blocking.

The boiling point of the poor solvent is usually not lower than 60° C., preferably not lower than 120°, more preferably not lower than 150° C., still more preferably not lower than 165° C. If the boiling point of the solvent is lower than 60° C., the pressure during the reaction is naturally higher. The reaction may be conducted under pressure with a low-boiling solvent. However, the boiling point of the solvent is preferably lower than the imidation reaction temperature at the ordinary atmospheric pressure, since satisfactory results are obtained by removal of formed water and excess amine during the reaction. The preferred solvent includes hydrocarbon solvents such as n-hexane, n-decane, n-dodecane, and the like.

The copolymer produced by the process of the present invention may additionally contain a thermal stabilizer, a UV stabilizer, a lubricant, a dye, an antistatic agent, another plastics, an elastomer or the like, if necessary.

The resin produced by the process of the present invention is superior in color tone and transparency, and is useful for wide application fields including optical parts, automobile parts, electric and electronic parts, medical instrument parts, food packaging and the like. Further, a composite of the copolymer of the present invention with another plastic or elastomer also gives a product superior in color tone.

The present invention is described more specifically below by reference to examples. The present invention is not limited to the example.

The formed copolymers were identified by elemental analysis, IR measurement, and NMR measurement in the examples.

The relative solution viscosity was measured by using N,N-dimethylforamide (DMF) as the solvent with an Ubbelohde viscometer at 23° C.

The molecular weight of the formed copolymer was measured by a 9gel permeation chromatography apparatus (GPC, manufactured by Tosoh Corporation) with chloroform as the solvent in terms of polystyrene.

The yellowness of the obtained copolymer was measured by Color Computer (manufactured by Suga Tester K.K.) with a press-molded specimen of 0.8 mm thick according to JIS K-5401 (Reflection method, tristimulus values of reflection plate, x: 79.44, y: 82.22, z: 94.51).

Reference Example 1

(Synthesis of maleic anhydride/isobutene copolymer)

Into a 30-liter autoclave equipped with a stirrer, a nitrogen-introducing tube, an isobutene-introducing tube, a thermometer, and a gas-releasing tube, were charged 2.8 kg of maleic anhydride, 10 g of lauryl mercaptane, 6.3 of t-butyl peroxypivalate, and 19 liters of isopropyl acetate. The interior of the autoclave was purged with nitrogen several times. Then 5.2 liters of liquefied isobutene was charged therein, and reaction was allowed to proceed at 60° C. for 6 hours.

The resulting particulate matter was collected by centrifugation and dried to obtain 4.4 kg of a maleic anhydride/ isobutene copolymer. The obtained copolymer contained 50 mole % of maleic anhydride units according to elemental analysis. The relative solution viscosity of the copolymer was 2.0. In the same manner, several batches of the reaction were carried out to obtain the samples of the maleic anhydride/isobutene copolymer.

EXAMPLE 1

In a 30-liter autoclave equipped with a stirrer, a nitrogen-introducing tube, a thermometer, and a gas releasing tube, were placed 2 kg of the particulate copolymer prepared in Reference Example 1 and 20 liters of isopropyl acetate. Thereto, 750 ml of liquefied methylamine was introduced, and then the content of the autoclave was stirred at 80° C. for 5 hours. After the reaction, the particulate polymer was collected by centrifugation and dried to obtain 2.4 kg of the amidation product of the maleic anhydride/isobutene copolymer.

The copolymer was confirmed to be amidated through ring opening of the acid anhydride group by the amine from the disappearance of the absorption peak of acid anhydride at 1850 $cm^{-1}$ and the appearance of new peaks of an amide group and a carboxylic acid group in the IR spectrum.

Subsequently, in a 15-liter autoclave equipped with a stirrer, a nitrogen-introducing tube, a thermometer, and a distillation device, were placed 1.8 kg of the above particulate amidated maleic anhydride/isobutene copolymer, and 7.2 kg of n-decane (solubility parameter δ value: 6.6). The interior of the autoclave was purged with nitrogen. Then with removal of produced water and the excess amine, temperature was raised up to 165° C., and reaction was allowed to proceed for 5 hours. After the reaction, the obtained particulate matter was collected by filtration, washed with hexane, and dried. The imidation ratio was found to be 100 and the copolymer was confirmed to constituted of 50 mole of N-methylsuccinimide units and 50 mole % of isobutene units according to characteristic absorption peaks at 1700 $cm^{-1}$ and 1780 $cm^{-1}$ in IR spectrum, $^{13}$C-NMR data, and elemental analysis. The obtained particulate polymer was pressed at 230° C. for 3 minutes to prepare a plastic sheet for yellowness evaluation. The obtained sheet had yellowness of 3.3 in average. The resulting sample was soluble in chloroform, and had a number-average molecular weight of 120000 according to GPC.

Then 100 parts by weight of the obtained particulate imidated copolymer and 0.2 part by weight of tris(2,4-di(t-butyl)phenyl) phosphite were mixed by shaking, and the mixture was melt-extruded continuously under nitrogen atmosphere by means of a twin-screw extruder set at temperatures of 150° C., 260° C., 280° C., and 270° C from the bottom of the hopper to the tip nozzle direction to obtain a transparent strand. The resulting strand was cut into pellets.

The pellets were injection-molded into test pieces by means of Minimat (a machine manufactured by Sumitomo Heavy Industries, Ltd.) at an injection temperature of 300° C. at a metal mold temperature of 100° C.

The test piece had a flexural strength of 1300 $kg/cm^2$, a flexural modulus of 47000 $kg/cm^2$, and a heat distortion temperature of 155° C. after annealing.

Comparative Example 1

In a 15-liter autoclave equipped with a stirrer, a nitrogen-introducing tube, and a thermometer a distillation device, were placed 2.7 kg of the above particulate amidated maleic anhydride/isobutene copolymer, and 6.3 kg of benzene (solubility parameter δ value: 9.2). The interior of the autoclave was purged with nitrogen. Then the temperature was raised up to 165° C., and reaction was allowed to proceed for 5 hours. After the reaction, the resulting polymer was taken out and dried. From the polymer, test pieces for yellowness evaluation were prepared by press molding. The yellowness of the test pieces was 28 in average.

Comparative Example 2

In a 15-liter autoclave equipped with a stirrer, a nitrogen-introducing tube, a thermometer, and a distillation device were placed 2.7 kg of the above particulate amidated maleic anhydride/isobutene copolymer, and 6.3 kg of cyclohexanone (solubility parameter δ value: 9.9). The interior of the autoclave was purged with nitrogen. Then the temperature was raised up to 160° C. Blocking of the polymer particles occurred 10 minutes after the temperature raise, and the reaction was interrupted.

As clearly shown in the examples, a succinimide copolymer having low yellowness and excellent transparency can prepared according to the process of the present invention at a high productivity. The copolymer is useful in various application fields such as optical parts, automobile parts, and electric and electronic parts.

What is claimed is:

1. A process for producing a copolymer having succinimide units represented by formula (I), comprising:

(a) reacting in a slurry state in a solvent having a solubility parameter δ value not higher than 9.0, a copolymer containing 40–60 mole % maleic anhydride units, 60–40 mole % olefin units, and 0–20 mole % other copolymerizable monomer units, with an amine containing 1 to 6 carbon atoms or ammonia to convert the maleic anhydride units to the succinimide units:

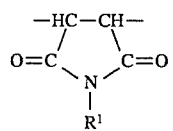

where $R^1$ is a hydrogen atom, or an alkyl or cycloalkyl group of 1 to 6 carbons; and thereafter (b) separating the copolymer as a solid from the reaction mixture of step (a).

2. The process according to claim 1 wherein the solubility parameter δ value is not greater than 8.5.

3. The process according to claim 2 wherein the solubility parameter δ value is not greater than 8.0.

* * * * *